US011499635B2

(12) United States Patent
Aihara et al.

(10) Patent No.: US 11,499,635 B2
(45) Date of Patent: Nov. 15, 2022

(54) GASKET AND SEALING STRUCTURE

(71) Applicant: NOK CORPORATION, Tokyo (JP)

(72) Inventors: Kazuya Aihara, Fukushima (JP); Isao Tanji, Fukushima (JP)

(73) Assignee: NOK CORPORATION, Tokyo (JP)

( * ) Notice: Subject to any disclaimer, the term of this patent is extended or adjusted under 35 U.S.C. 154(b) by 130 days.

(21) Appl. No.: 16/846,691

(22) Filed: Apr. 13, 2020

(65) Prior Publication Data
US 2020/0240520 A1 Jul. 30, 2020

Related U.S. Application Data

(63) Continuation of application No. PCT/JP2019/041312, filed on Oct. 21, 2019.

(30) Foreign Application Priority Data

Nov. 5, 2018 (JP) .............................. JP2018-208183

(51) Int. Cl.
F16J 15/08 (2006.01)
(52) U.S. Cl.
CPC ................... F16J 15/0818 (2013.01)
(58) Field of Classification Search
CPC ................ F16J 15/0181; F16J 15/0818; F16J 2015/0856; F16J 15/0825
See application file for complete search history.

(56) References Cited

U.S. PATENT DOCUMENTS 6,422,572 B1 7/2002 Ueda et al.
10,520,088 B2 * 12/2019 Watanabe .............. F16J 15/064
(Continued)

FOREIGN PATENT DOCUMENTS

CN 101216105 7/2008
CN 103635724 3/2014
(Continued)

OTHER PUBLICATIONS

International Preliminary Report on Patentability issued in International Patent Application No. PCT/JP2019/041312, dated May 11, 2021, together with an English translation thereof.
(Continued)

Primary Examiner — Eugene G Byrd
(74) Attorney, Agent, or Firm — Greenblum & Bernstein, P.L.C.

(57) ABSTRACT

An upper gasket member includes an upper base portion of an annular flat plate, an upper outer periphery portion diagonally extending to an upper side from an outer periphery edge portion of the upper base portion, and an upper outer periphery side annular portion of an annular flat plate extending in an extension direction of the upper base portion from an outer periphery edge portion of the upper outer periphery portion. Further, a lower gasket member includes a lower base portion of an annular flat plate, a lower outer periphery portion diagonally extending to a lower side from an outer periphery edge portion of the lower base portion, and a lower outer periphery side annular portion of an annular flat plate extending in an extension direction of the lower base portion from an outer periphery edge portion of the lower outer periphery portion.

8 Claims, 3 Drawing Sheets

(56) References Cited

U.S. PATENT DOCUMENTS

| | | | |
|---|---|---|---|
| 2002/0000696 A1* | 1/2002 | Okazaki | F16J 15/0818 277/592 |
| 2004/0044122 A1* | 3/2004 | Boldt | C09D 175/16 524/589 |
| 2005/0206091 A1* | 9/2005 | Detmann | F16J 15/0818 277/594 |
| 2008/0023923 A1 | 1/2008 | Kameyama et al. | |
| 2011/0127729 A1* | 6/2011 | Takeda | F16J 15/0818 277/592 |
| 2015/0069719 A1* | 3/2015 | Hu | F16J 15/0818 277/593 |
| 2015/0211637 A1 | 7/2015 | Aihara et al. | |
| 2016/0223085 A1* | 8/2016 | Yamazaki | F16J 15/0818 |
| 2020/0182355 A1* | 6/2020 | Claus | F16J 15/0818 |

FOREIGN PATENT DOCUMENTS

| | | | | |
|---|---|---|---|---|
| CN | 108474473 | 8/2018 | | |
| EP | 1031774 | 8/2000 | | |
| JP | 63-168364 U | 11/1988 | | |
| JP | 3-49354 U | 5/1991 | | |
| JP | 9-68281 | 3/1997 | | |
| JP | 2002-349346 | 12/2002 | | |
| JP | 2009-156382 | 7/2009 | | |
| JP | 2013-36607 | 2/2013 | | |
| JP | 2014-111948 | 6/2014 | | |
| JP | 2017180644 A | * 10/2017 | | F01N 13/1844 |
| WO | 2017/187978 | 11/2017 | | |

OTHER PUBLICATIONS

China Office Action issued in China Patent Application No. 201980005173.3, dated Aug. 2, 2021, together with English translation thereof.

International Search Report issued in International Patent Application No. PCT/JP2019/041312, dated Nov. 26, 2019.

China Office Action issued in China Patent Application No. 201980005173.3, dated Feb. 24, 2022, together with English translation thereof.

China Office Action issued in China Patent Application No. 201980005173.3, dated May 12, 2022, together with English translation thereof.

Extended European Search Report issued in European Patent application No. 19858707.3, dated Jul. 12, 2022.

* cited by examiner

GASKET AND SEALING STRUCTURE

CROSS REFERENCE TO RELATED APPLICATIONS

The present application is a continuation application of International Application No. PCT/JP2019/041312, filed on Oct. 21, 2019, which claims priority to Japanese Patent Application No. 2018-208183, filed on Nov. 5, 2018. The contents of these applications are incorporated herein by reference in their entirety.

BACKGROUND

Technical Field

The present disclosure relates to a gasket and a sealing structure, and particularly relates to a gasket and a sealing structure that are used in a vehicle, a general-purpose machine or the like.

Background

In a vehicle, or a general-purpose machine, for example, an automobile, a gasket is used for an engine, a device housing an electronic component therein or the like to seal a housing. A gasket is elastically deformed by being arranged in a compressed state between a pair of members that form a housing in combination, for example, thereby sealing the pair of members and sealing the housing.

An automobile may travel in a beach area or in an area where snow melting agent is sprayed. At this time, salt water or snow melting agent may adhere to a component of the automobile, and the salt water or the snow melting agent may enter and may be retained between the members that arrange and press the gasket. By the retained salt water or snow melting agent, corrosion may occur to the members that arrange and press the gasket.

When the members that arrange and press the gasket are formed of an aluminum alloy, aluminum has a high ionization tendency, and thus the members that arrange and press the gasket are easily corroded by retained salt water or snow melting agent. When the corroded portion exceeds a seal line of the gasket, a sealing function of the gasket is reduced or eliminated. Therefore, to components using gaskets, a salt spray test is performed in advance, and evaluation of corrosion resistance is performed.

In the salt spray test, in the component provided with a gasket, salt water is retained in the gap between the members that arrange and press the gasket, and the component is alternately placed in a dry state and a wet state repeatedly, and evaluation of corrosion resistance to salt water is performed.

In order to suppress reduction in sealing performance of the gasket in this way, it is preferable that the members that arrange and press the gasket are not corroded by salt water and a snow melting agent, and there has been conventionally proposed a structure of the gasket for suppressing corrosion of the members that arrange and press the gasket by salt water and snow melting agent.

The structure of the conventional gasket like this includes a metal plate, and a film-shaped coating layer that covers at least a part of the metal plate and is formed of an elastic body, in a free state where the gasket is not arranged and pressed. The metal plate has an annular base portion, an inner periphery portion extending from an inner periphery edge that is an edge on an inner periphery side of the base portion, and an outer periphery portion extending from an outer periphery edge that is an edge on an outer periphery side of the base portion. The inner periphery portion extends diagonally from the inner periphery edge of the base portion toward a side which a lower surface of the base portion faces, and the outer periphery portion extends diagonally from the outer periphery edge of the base portion toward the side which the lower surface of the base portion faces.

In the structure of the conventional gasket like this, in the assembled state, the gasket is arranged and pressed between a pair of members, and contacts a flat surface of one member via the coating layer in the center portion of the lower surface of the base portion and a vicinity of the center portion. Thereby, five seal lines are formed between the gasket and the pair of members (for example, see International Publication No. WO 2017/187978).

The structure of the conventional gasket like this has a gap between one member and the outer periphery portion of the gasket. Here, if the gap between one member and the outer periphery portion of the gasket can be decreased, it is difficult for salt water to be retained in the gap between one member and the outer periphery portion of the gasket, and it becomes possible to reduce the speed at which the one member is corroded. Therefore, the conventional gasket has been required to have the structure that can further reduce the speed at which the members that arrange and press the gasket are corroded.

The present disclosure is made in the light of the aforementioned problem, and it is an object of the present disclosure to provide a gasket and a sealing structure that can further reduce a speed at which members that arrange and press the gasket are corroded.

SUMMARY

In order to attain the above described object, a gasket according to the present disclosure is a gasket including a pair of gasket members each including a metal plate, and rubber layers coated on both surfaces of the metal plate, the gasket wherein the pair of gasket members oppose each other, and respectively include base portions of annular flat plates, outer periphery portions diagonally extending in directions away from each other from edge portions on an outer periphery side of the base portions, and outer periphery side annular portions of annular flat plates extending in an extension direction of the base portions from the edge portions on the outer periphery side of the outer periphery portions.

In the gasket according to one aspect of the present disclosure, the pair of gasket members further include inner periphery portions diagonally extending in directions away from each other from edge portions on an inner periphery side of the base portions, and inner periphery side annular portions of the annular flat plates extending in the extension direction of the base portions from edge portions on the inner periphery side of the pair of inner periphery portions.

In the gasket according to one aspect of the present disclosure, the outer periphery portions respectively increase in diameter toward the directions away from each other, and the inner periphery portions respectively decrease in diameter toward the directions away from each other.

In order to attain the above described object, a sealing structure according to the present disclosure is a sealing structure including a pair of members that form a housing by being combined with each other, and a gasket that is arranged and held between the pair of members, is elastically deformed by being arranged and pressed in a space between the pair of members, and seals the space between the pair of members, the sealing structure wherein the gasket includes a pair of gasket members each including a metal plate and rubber layers coated on both surfaces of the metal plate, and a connection member connecting the pair of gasket members, the pair of gasket members oppose each other, and respectively include base portions of annular flat plates, outer periphery portions diagonally extending in directions away from each other from edge portions on an outer periphery side of the base portions, and outer periphery side annular portions of annular flat plates extending in extension directions of the base portions from edge portions on the outer periphery side of the outer periphery portions, and the pair of members respectively include diameter increasing surfaces increasing in diameter toward the directions away from each other, in end portions on the outer periphery side.

According to the gasket and the sealing structure of the present disclosure, the speed at which the members that arrange and press the gasket are corroded can be further reduced.

DETAILED DESCRIPTION

Hereinafter, an embodiment of the present disclosure will be described with reference to the drawings.

Figure 1:
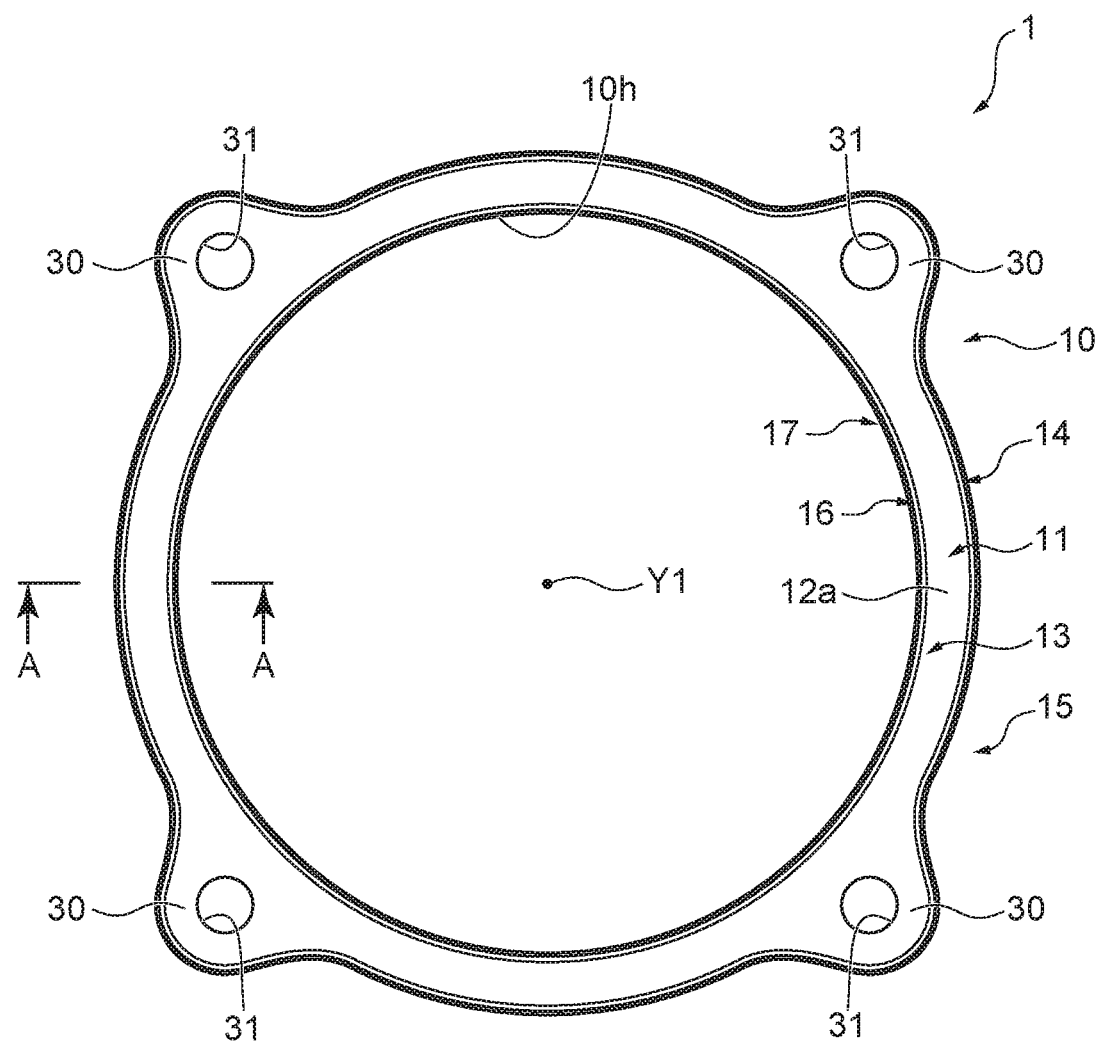
FIG. 1 is a front view illustrating a schematic configuration of a gasket according to an embodiment of the present disclosure.
Figure 2:
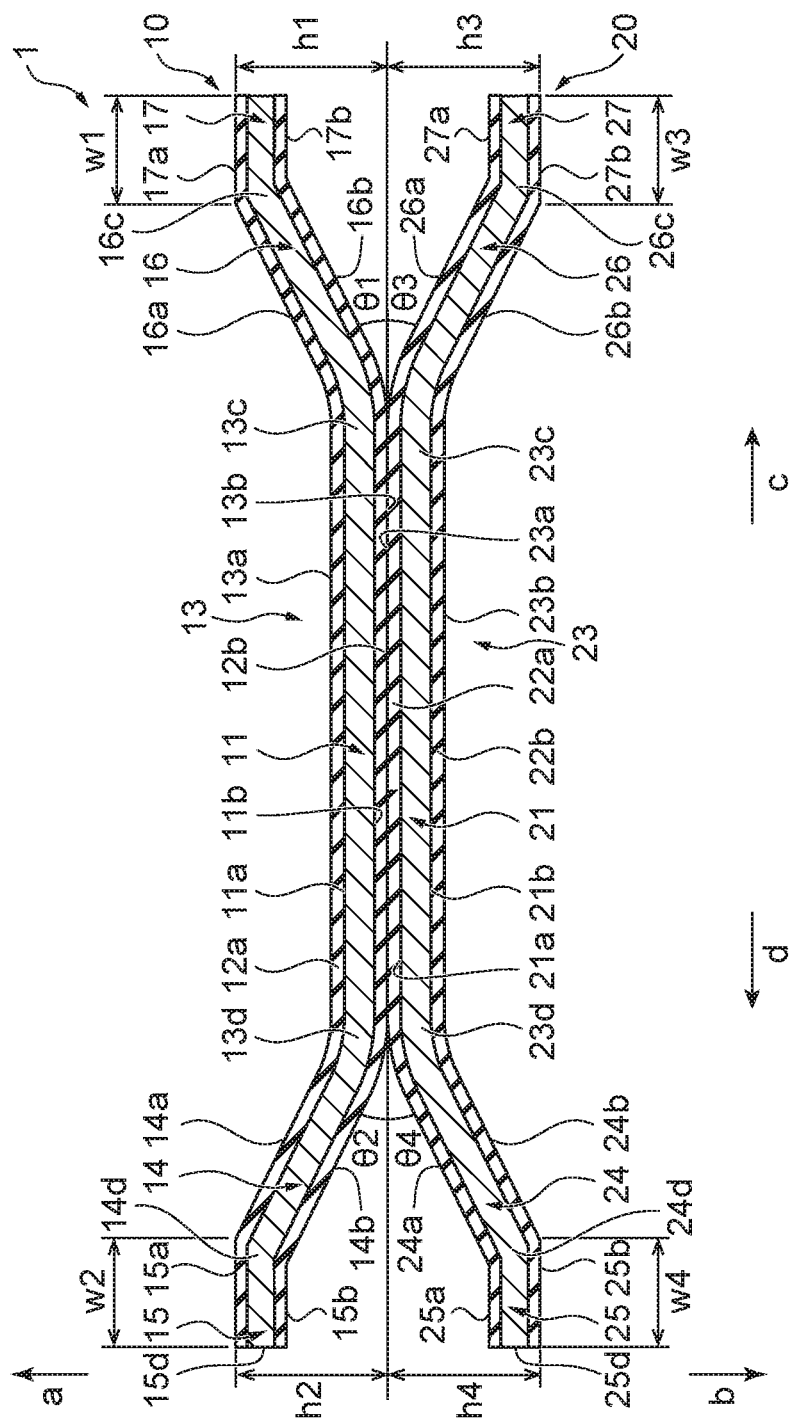
FIG. 2 is a sectional view taken along line A-A of the gasket illustrated in FIG. 1.

FIG. 1 is a front view illustrating a schematic configuration of a gasket 1 according to the embodiment of the present disclosure, and FIG. 2 is a sectional view taken along line A-A of the gasket 1 illustrated in FIG. 1. Hereinafter, for convenience of explanation, one direction (an arrow a direction) in a direction of an axis Y1 (hereinafter, also referred to as an axis Y1 direction) that is an axis of the gasket 1 in FIGS. 1 and 2 is set as an upper side, and another direction (an arrow b direction) is set as a lower side. Further, one direction (an arrow c direction) in a radial direction extending to be orthogonal to the axis Y1 of the gasket 1 in FIGS. 1 and 2 is set as an inner periphery side (a closed space side enclosed by the gasket 1), and another direction (arrow d direction) is set as an outer periphery side. When positional relationships and directions of the respective members are explained by using up and down in the following explanation, the up and down indicate the positional relationships and directions only in the drawings, and do not indicate the positional relationships and the directions when the respective members are incorporated in the actual vehicle or the like.

The gasket 1 is used in a vehicle, a general-purpose industrial machine or the like, and is used for sealing a space between two members by being elastically deformed by being arranged and pressed between the two members. The gasket 1 is arranged and pressed between the two members forming a housing, for example, in an engine or the like, and seals the housing. In FIGS. 1 and 2, the gasket 1 that is not arranged and pressed between the two members forming a housing, but is in a free state is illustrated.

The gasket 1 according to the embodiment of the present disclosure includes a pair of gasket members (an upper gasket member 10, a lower gasket member 20) having metal plates 11 and 21, rubber layers (upper rubber layers 12a and 22a, lower rubber layers 12b and 22b) coated on both surfaces (upper surfaces 11a and 21a, lower surfaces 11b and 21b) of the metal plates 11 and 21. The pair of gasket members (the upper gasket member 10 and the lower gasket member 20) oppose each other.

The pair of gasket members (the upper gasket member 10 and the lower gasket member 20) respectively include base portions (an upper base portion 13, a lower base portion 23) of annular flat plates, outer periphery portions (an upper outer periphery portion 14, a lower outer periphery portion 24), and outer periphery side annular portions (an upper outer periphery side annular portion 15, a lower outer periphery side annular portion 25) of annular flat plates. The outer periphery portions (the upper outer periphery portion 14, the lower outer periphery portion 24) extend diagonally in directions (the axis Y1 direction (arrows ab directions)) away from each other from edge portions (outer periphery edge portions 13d, 23d) on an outer periphery side (the arrow d direction) of the base portions (the upper base portion 13, the lower base portion 23).

The outer periphery side annular portions (the upper outer periphery side annular portion 15, the lower outer periphery side annular portion 25) extend in the extension direction (a radial direction (arrows cd directions)) of the base portions (the upper base portion 13, the lower base portion 23) from the edge portions (the outer periphery edge portions 14d, 24d) on the outer periphery side of the outer periphery portions (the upper outer periphery portion 14, the lower outer periphery portion 24). Hereinafter, a configuration of the gasket 1 will be described specifically.

As illustrated in FIG. 2, the gasket 1 has the upper gasket member 10 and the lower gasket member 20. As illustrated in FIG. 1, the upper gasket member 10 has an outside shape formed into an annular shape, and an annular opening portion 10h is formed in a center portion thereof. In other words, the upper gasket member 10 is formed to be an annular flat plate as a whole.

In the upper gasket member 10, a plurality (in FIG. 1, four) of positioning portions 30 each in a substantially semicircular shape that protrude toward the outer periphery side (the arrow d direction) from the outer peripheral surface of the upper gasket member 10 are provided. In the plurality of positioning portions 30, bolt holes 31 that are insertion holes through which bolts for fastening the two members so that the gasket 1 is arranged and held between the members are inserted are formed.

The upper gasket member 10 is a rubber-coated metal (Hereinafter, also referred to as RCM.). In other words, the upper gasket member 10 has the metal plate 11, the upper rubber layer 12a that is coated on the upper surface 11a that is the surface on the upper side (the arrow a direction) of the metal plate 11, and the lower rubber layer 12b that is coated on the lower surface 11b that is the surface on the lower side (the arrow b direction) of the metal plate 11, as illustrated in FIG. 2.

The metal plate 11 is, for example, a steel sheet, stainless steel, a cold rolled steel sheet, a galvanized steel sheet, an aluminum alloy sheet or the like. The metal plate 11 may be formed of one metal plate having elasticity, or may be formed by laminating and overlapping a plurality of metal plates having elasticity each other. The upper rubber layer 12a and the lower rubber layer 12b are, for example, a synthetic rubber (including foam rubber) or the like including at least one kind of a nitryl rubber, a styrene butadiene rubber, a fluororubber, an acrylic rubber, and a silicon rubber, for example. Thicknesses of the metal plate 11, the upper rubber layer 12a and the lower rubber layer 12b are respectively uniform or substantially uniform. Considering attenuation of rubber, it is more preferable that the upper rubber layer 12a and the lower rubber layer 12b are of a foam rubber than a solid rubber.

The upper gasket member 10 includes the upper base portion 13 of the annular flat plate, the upper outer periphery portion 14 that extends diagonally to the upper side (the arrow a direction) from the outer periphery edge portion 13d that is the edge portion on the outer periphery side (the arrow d direction) of the upper base portion 13, and the upper outer periphery side annular portion 15 of the annular flat plate extending in the extension direction (radial direction (the arrows cd directions)) of the upper base portion 13 from the outer periphery edge portion 14d that is the edge portion on the outer periphery side of the upper outer periphery portion 14. The upper base portion 13, the upper outer periphery portion 14 and the upper outer periphery side annular portion 15 are respectively formed of the metal plate 11, the upper rubber layer 12a and the lower rubber layer 12b.

The upper base portion 13 is a portion extending annularly in an endless shape. An inner periphery edge portion 13c that is an edge portion on the inner periphery side (the arrow c direction) of the upper base portion 13 and the outer periphery edge portion 13d smoothly extend annularly. As illustrated in FIG. 1, in the outer periphery edge portion 13d, the positioning portion 30 smoothly extends along the bolt hole 31 to the outer periphery side in the vicinity of the portion where the bolt hole 31 is formed. Between the inner periphery edge portion 13c and the outer periphery edge portion 13d, an upper surface 13a and a lower surface 13b that are flat surfaces back to back with each other extend. The upper surface 13a is the surface on the upper side (the arrow a direction) in FIG. 2, and the lower surface 13b is the surface on the lower side (the arrow b direction) in FIG. 2.

The upper outer periphery portion 14 is formed by being diagonally curved to the upper side (the arrow a direction) from the outer periphery edge portion 13d of the upper base portion 13. The upper outer periphery portion 14 has an upper surface 14a that is a surface continuing to the upper surface 13a of the upper base portion 13, and a lower surface 14b that is a surface continuing to the lower surface 13b of the upper base portion 13. The upper outer periphery portion 14 is a portion increasing in diameter toward the upper side (the arrow a direction) from the outer periphery edge portion 13d of the upper base portion 13. In other words, the upper outer periphery portion 14 presents a conical tubular shape. Note that the upper outer periphery portion 14 may be in an annular shape having another smooth curved surface such as a trumpet shape.

The upper outer periphery side annular portion 15 is a portion annularly extending in an endless shape from the outer periphery edge portion 14d of the upper outer periphery portion 14. The upper outer periphery side annular portion 15 is formed by being diagonally curved to the lower side (the arrow b direction) and the outer periphery side (the arrow d direction) from an outer periphery edge portion 14d of the upper outer periphery portion 14. The upper outer periphery side annular portion 15 extends parallel or substantially parallel with the upper base portion 13 in the radial direction (the arrows cd directions). The upper outer periphery side annular portion 15 has an upper surface 15a that is a surface continuing to the upper surface 14a of the upper outer periphery portion 14, and a lower surface 15b that is a surface continuing to the lower surface 14b of the upper outer periphery portion 14.

Further, the upper gasket member 10 includes an upper inner periphery portion 16 that diagonally extends to the upper side (the arrow a direction) from the inner periphery edge portion 13c that is the edge portion on the inner periphery side (the arrow c direction) of the upper base portion 13, and an upper inner periphery side annular portion 17 of an annular flat plate extending in an extension direction (the radial direction (the arrows cd directions)) of the upper base portion 13 from an inner periphery edge portion 16c that is an edge portion on the inner periphery side of the upper inner periphery portion 16.

The upper inner periphery portion 16 is formed by being diagonally curved to the lower side (the arrow b direction) from the inner periphery edge portion 13c of the upper base portion 13. The upper inner periphery portion 16 has an upper surface 16a that is a surface continuing to the upper surface 13a of the upper base portion 13, and a lower surface 16b that is a surface continuing to the lower surface 13b of the upper base portion 13. The upper inner periphery portion 16 is a portion that decreases in diameter toward the upper side (the arrow a direction) from the inner periphery edge portion 13c of the upper base portion 13. In other words, the upper inner periphery portion 16 presents a conical tubular shape. Note that the upper inner periphery portion 16 may be in an annular shape having another smooth curved surface such as a trumpet shape.

The upper inner periphery side annular portion 17 is a portion extending annularly in an endless shape from an inner periphery edge portion 16c of the upper inner periphery portion 16. The upper inner periphery side annular portion 17 is formed by being diagonally curved to the lower side (the arrow b direction) and the inner periphery side (the arrow c direction) from the inner periphery edge portion 16c of the upper inner periphery portion 16. The upper inner periphery side annular portion 17 extends parallel or substantially parallel with the upper base portion 13 in the radial direction (the arrows cd directions). The upper inner periphery side annular portion 17 has an upper surface 17a that is a surface continuing to the upper surface 16a of the upper inner periphery portion 16, and a lower surface 17b that is a surface continuing to the lower surface 16b of the upper inner periphery portion 16.

The upper inner periphery portion 16 and the upper inner periphery side annular portion 17, and the upper outer periphery portion 14 and the upper outer periphery side annular portion 15 are formed symmetrically in the outer periphery side (the arrow d direction) and the inner periphery side (the arrow c direction) of the upper base portion 13. A length of the upper inner periphery portion 16 is a same length or substantially the same length as a length of the upper outer periphery portion 14, and an angle θ1 of the upper inner periphery portion 16 to the upper base portion 13 is a same or substantially the same angle as an angle θ2 of the upper outer periphery portion 14 to the upper base portion 13.

Further, a height h1 in the axis Y1 direction (the arrows ab directions) of the upper inner periphery side annular portion 17 is a same or substantially the same height as a height h2 in the axis Y1 direction of the upper outer periphery side annular portion 15, and a width w1 in the radial direction (the arrows cd directions) of the upper inner periphery side annular portion 17 is a same or substantially the same width as a width w2 in the radial direction of the upper outer periphery side annular portion 15. Note that the upper inner periphery portion 16 and the upper inner periphery side annular portion 17, and the upper outer periphery portion 14 and the upper outer periphery side annular portion 15 may be asymmetrical.

In the gasket 1, the lower gasket member 20 is in a same or substantially the same shape as the upper gasket member 10 illustrated in FIG. 1. In other words, in the lower gasket member 20, an outer shape is formed into an annular shape, and in a center portion of the lower gasket member 20, an annular opening portion (not illustrated) is formed. In other words, the lower gasket member 20 is formed to be an annular flat plate as a whole.

In the lower gasket member 20, a plurality of positioning portions (not illustrated) each in a substantially semicircular shape projecting toward the outer periphery side (the arrow d direction) from the outer peripheral surface of the lower gasket member 20 are provided in same or substantially the same positions in the axial direction (the arrows ab directions) as the positioning portions 30 of the upper gasket member 10. In the plurality of positioning portions, bolt holes (not illustrated) that are through-holes through which bolts for arranging and holding the gasket 1 are inserted are formed, in same or substantially the same positions in the axis Y1 direction (the arrows ab directions) as the bolt holes 31 of the upper gasket member 10 respectively.

The lower gasket member 20 is of RCM. In other words, the lower gasket member 20 has the metal plate 21, the upper rubber layer 22a coated on the upper surface 21a that is the surface on the upper side (the arrow a direction) of the metal plate 21, and the lower rubber layer 22b that is coated on the lower surface 21b that is the surface on the lower side (the arrow b direction) of the metal plate 21. The metal plate 21, the upper rubber layer 22a and the lower rubber layer 22b are formed of same or substantially the same materials as the materials of the metal plate 11, the upper rubber layer 12a and the lower rubber layer 12b of the upper gasket member 10.

Thicknesses of the metal plate 21, the upper rubber layer 22a and the lower rubber layer 22b are respectively uniform or substantially uniform. Further, the thicknesses of the metal plate 21, the upper rubber layer 22a and the lower rubber layer 22b are same or substantially the same thicknesses as the thicknesses of the metal plate 11, the upper rubber layer 12a and the lower rubber layer 12b of the upper gasket member 10.

The lower gasket member 20 is disposed on the lower side (the arrow b direction) of the upper gasket member 10 to oppose the upper gasket member 10. The lower gasket member 20 is formed symmetrically with the upper gasket member 10 in the axis Y1 direction (the arrows ab directions).

The lower gasket member 20 includes the lower base portion 23 of the annular flat plate, the lower outer periphery portion 24 diagonally extending to the lower side (the arrow b direction) from the outer periphery edge portion 23d that is the edge portion on the outer periphery side (the arrow d direction) of the lower base portion 23, and the lower outer periphery side annular portion 25 of the annular flat plate extending in the extension direction (the radial direction (the arrows cd directions)) of the lower base portion 23 from the outer periphery edge portion 24d that is the edge portion on the outer periphery side of the lower outer periphery portion 24. The lower base portion 23, the lower outer periphery portion 24 and the lower outer periphery side annular portion 25 are respectively formed of the metal plate 21, the upper rubber layer 22a and the lower rubber layer 22b.

The lower base portion 23 is a portion extending annularly in an endless shape. An inner periphery edge portion 23c that is an edge portion at an inner periphery side (the arrow c direction) of the lower base portion 23 and the outer periphery edge portion 23d smoothly extend annularly. In the outer periphery edge portion 23d, positioning portions (not illustrated) smoothly extend along bolt holes to the outer periphery side in the vicinity of the portions where the bolt holes (not illustrated) are formed. Between the inner periphery edge portion 23c and the outer periphery edge portion 23d, an upper surface 23a and a lower surface 23b that are planes back to back with each other extend. The upper surface 23a is a surface on the upper side (the arrow a direction) in FIG. 2, and the lower surface 23b is a surface on the lower side (the arrow b direction) in FIG. 2. A width in the radial direction (the arrows cd directions) in the lower base portion 23 is a same or substantially the same width as a width in the radial direction of the upper base portion 13.

The lower outer periphery portion 24 is formed by being diagonally curved to the lower side (the arrow b direction) from the outer periphery edge portion 23d of the lower base portion 23. The lower outer periphery portion 24 has an upper surface 24a that is a surface continuing to the upper surface 23a of the lower base portion 23, and a lower surface 24b that is a surface continuing to the lower surface 23b of the lower base portion 23. The lower outer periphery portion 24 is a portion in which a diameter increases toward the lower side (the arrow b direction) from the outer periphery edge portion 23d of the lower base portion 23. In other words, the lower outer periphery portion 24 presents a conical tubular shape. Note that the lower outer periphery portion 24 may be in an annular shape having another smooth curved surface such as a trumpet shape.

A length of the lower outer periphery portion 24 is a same or substantially the same length as the length of the upper outer periphery portion 14 of the upper gasket member 10, and an angle θ4 of the lower outer periphery portion 24 to the lower base portion 23 is a same or substantially the same angle as the angle θ2 of the upper outer periphery portion 14 to the upper base portion 13 in the upper gasket member 10.

The lower outer periphery side annular portion 25 is a portion extending annularly in an endless shape from the outer periphery edge portion 24d of the lower outer periphery portion 24. The lower outer periphery side annular portion 25 is formed by being diagonally curved to the upper side (the arrow a direction) and the outer periphery side (the arrow d direction) from the outer periphery edge portion 24d of the lower outer periphery portion 24. The lower outer periphery side annular portion 25 extends parallel or substantially parallel with the lower base portion 23 in the radial direction (the arrows cd directions). The lower outer periphery side annular portion 25 has an upper surface 25a that is a surface continuing to the upper surface 24a of the lower outer periphery portion 24, and a lower surface 25b that is a surface continuing to the lower surface 24b of the lower outer periphery portion 24.

A height h4 in the axis Y1 direction (the arrows ab directions) of the lower outer periphery side annular portion 25 to the lower base portion 23 is a same or substantially the same height as the height h2 in the axis Y1 direction of the upper outer periphery side annular portion 15 to the upper base portion 13, and a width w4 in the radial direction (the arrows cd directions) of the lower outer periphery side annular portion 25 is a same or substantially the same width as the width w2 in the radial direction of the upper outer periphery side annular portion 15.

Further, the lower gasket member 20 includes a lower inner periphery portion 26 that diagonally extends to the lower side (the arrow b direction) from the inner periphery edge portion 23c that is an edge portion at the inner periphery side (the arrow c direction) of the lower base portion 23, and a lower inner periphery side annular portion 27 of an annular flat plate extending in the extension direction (the radial direction (the arrows cd directions)) of the lower base portion 23 from an inner periphery edge portion 26c that is an edge portion on the inner periphery side of the lower inner periphery portion 26.

The lower inner periphery portion 26 is formed by being diagonally curved to the lower side (the arrow b direction) from the inner periphery edge portion 23c of the lower base portion 23. The lower inner periphery portion 26 has an upper surface 26a that is a surface continuing to the upper surface 23a of the lower base portion 23, and a lower surface 26b that is a surface continuing to a lower surface 23b of the lower base portion 23. The lower inner periphery portion 26 is a portion in which a diameter decreases toward the lower side (the arrow b direction) from the inner periphery edge portion 23c of the lower base portion 23. In other words, the lower inner periphery portion 26 presents a conical tubular shape. Note that the lower inner periphery portion 26 may be in an annular shape having another smooth curved surface such as a trumpet shape.

A length of the lower inner periphery portion 26 is a same or substantially the same length as the length of the upper inner periphery portion 16 of the upper gasket member 10, and an angle θ3 of the lower inner periphery portion 26 to the lower base portion 23 is a same or substantially the same angle as the angle θ1 of the upper inner periphery portion 16 in the upper gasket member 10 to the upper base portion 13.

The lower inner periphery side annular portion 27 is a portion extending annularly in an endless shape from the inner periphery edge portion 26c of the lower inner periphery portion 26. The lower inner periphery side annular portion 27 is formed by being diagonally curved to the upper side (the arrow a direction) and the inner periphery side (the arrow c direction) from the inner periphery edge portion 26c of the lower inner periphery portion 26. The lower inner periphery side annular portion 27 extends parallel or substantially parallel with the lower base portion 23 in the radial direction (the arrows cd directions). The lower inner periphery side annular portion 27 has an upper surface 27a that is a surface continuing to the upper surface 26a of the lower inner periphery portion 26, and a lower surface 27b that is a surface continuing to the lower surface 26b of the lower inner periphery portion 26.

A height h3 in the axis Y1 direction (the arrows ab directions) of the lower inner periphery side annular portion 27 to the lower base portion 23 is a same or substantially the same height as the height h1 in the axis Y1 direction of the upper inner periphery side annular portion 17 to the upper base portion 13, and a width w3 in the radial direction (the arrows cd directions) of the lower inner periphery side annular portion 27 is a same or substantially the same width as the width w1 in the radial direction of the upper inner periphery side annular portion 17.

The lower inner periphery portion 26 and the lower inner periphery side annular portion 27, and the lower outer periphery portion 24 and the lower outer periphery side annular portion 25 are formed symmetrically in the outer periphery side (the arrow d direction) and the inner periphery side (the arrow c direction) of the lower base portion 23. A length of the lower inner periphery portion 26 is a same or substantially the same length as the length of the lower outer periphery portion 24, and the angle θ3 of the lower inner periphery portion 26 to the lower base portion 23 is a same or substantially the same angle as the angle θ4 of the lower outer periphery portion 24 to the lower base portion 23.

Further, the height h3 in the axis Y1 direction (the arrows ab directions) of the lower inner periphery side annular portion 27 is a same or substantially the same height as the height h4 in the axis Y1 direction of the lower outer periphery side annular portion 25, and the width w3 in the radial direction (the arrows cd directions) of the lower inner periphery side annular portion 27 is a same or substantially the same width as the width w4 in the radial direction of the lower outer periphery side annular portion 25. Note that the lower inner periphery portion 26 and the lower inner periphery side annular portion 27, and the lower outer periphery portion 24 and the lower outer periphery side annular portion 25 may be asymmetrical. Further, the lower gasket member 20 may be asymmetrical with the upper gasket member 10 in the axis Y1 direction (the arrows ab directions).

Figure 3:
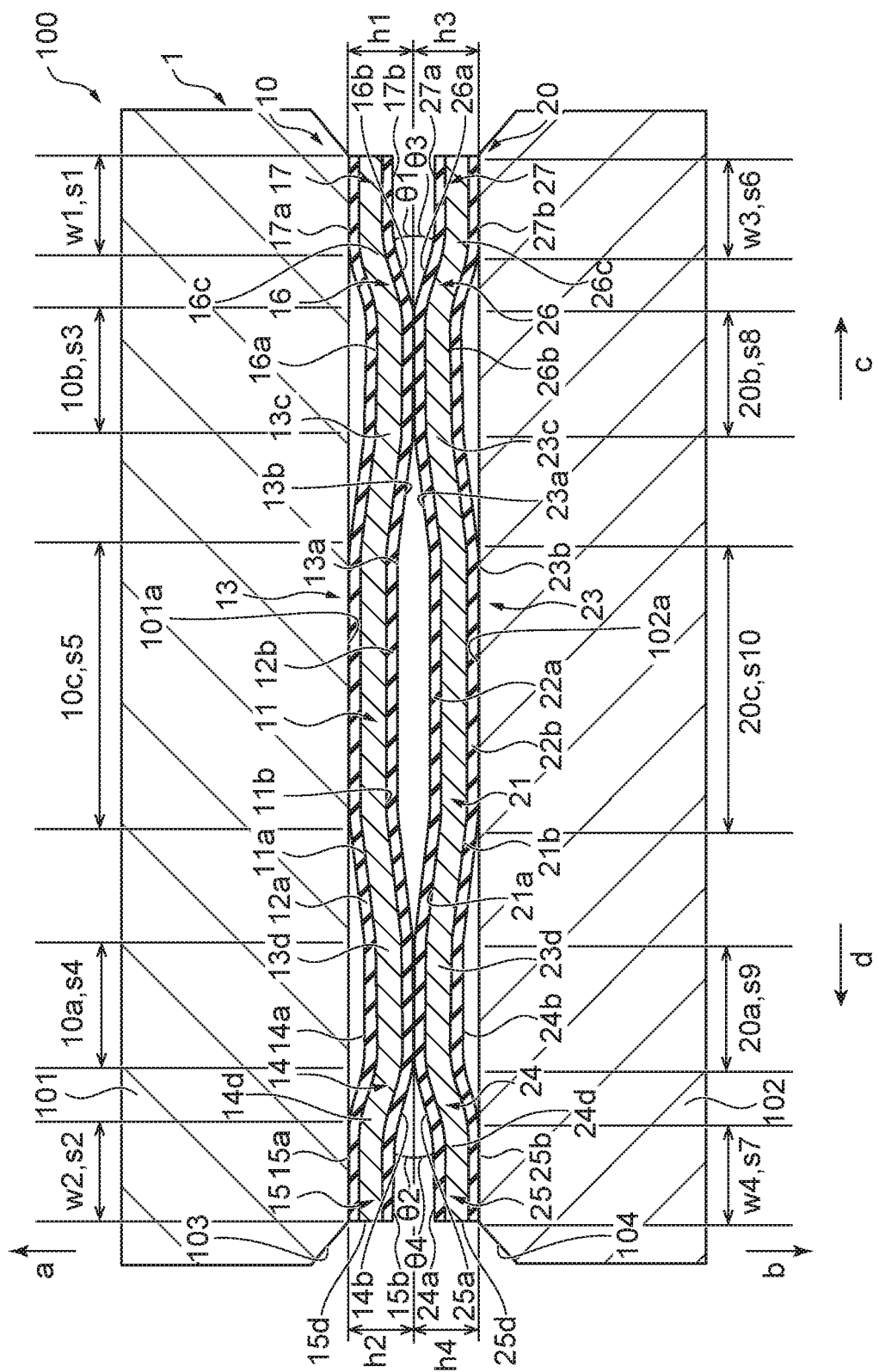
FIG. 3 is an enlarged sectional view of a sealing structure illustrating a state where the gasket illustrated in FIG. 2 is arranged and pressed.

Subsequently, a state where the gasket 1 is mounted to one member 101 and another member 102 that are objects to be sealed will be described. FIG. 3 is an enlarged sectional view of a sealing structure 100 illustrating a state where the gasket 1 illustrated in FIG. 2 is arranged and pressed. On an upper side (the arrow a direction) of the gasket 1, one of two members that are the objects to be sealed in a vehicle of an automobile or the like, for example, the one member 101 formed of a cylinder head or the like of an internal combustion engine is disposed. Further, on a lower side (the arrow b direction) of the gasket 1, another one of the two members that are the objects to be sealed in the vehicle of an automobile or the like, for example, the other member 102 formed of a cylinder block or the like of the internal combustion engine is disposed.

The one member 101 and the other member 102 respectively include diameter increasing surfaces 103 and 104 that increase in diameter toward the directions (the arrows ab directions) away from each other, in end portions at the outer periphery side (the arrow d direction). Specifically, in an end portion of the outer periphery side (the arrow d direction) of the one member 101, the annular diameter increasing surface 103 is formed as illustrated in FIG. 3. The diameter increasing surface 103 extends from a plane 101a of the one member 101 to the upper side (the arrow a direction) diagonally while increasing in diameter to the outer periphery side (the arrow d direction). Further, in an end portion of the outer periphery side (the arrow d direction) of the other member 102, the annular diameter increasing surface 104 is formed. The diameter increasing surface 104 extends from a plane 102a of the other member 102 diagonally to the lower side (the arrow b direction) while increasing in diameter to the outer periphery side (the arrow d direction).

The gasket 1 is arranged and held between the one member 101 and the other member 102 of the objects to be sealed in the mounted state, is arranged and pressed between the one member 101 and the other member 102 to be elastically deformed, and seals a space between the one member 101 and the other member 102. Specifically, the one member 101 and the other member 102 are fastened in a state where the plane 101a formed in the one member 101 and the plane 102a formed in the other member 102 oppose each other, and the gasket 1 is arranged and pressed between the plane 101a and the plane 102a to be elastically deformed.

The one member 101 and the other member 102 are, for example, a cylinder block and a cylinder head of an engine, a cylinder block and an oil pan, members forming a case of a fuel cell stack, a housing of the other devices and the like. The planes 101a and 102a are formed in flange portions formed in the one member 101 and the other member 102, for example.

The gasket 1 elastically deforms from a free state illustrated in FIG. 2 in a fastening process of the one member 101 and the other member 102, and fastening operation is performed until a desired contact pressure occurs in a contact portion (seal line) of the one member 101 and the other member 102. Fastening is performed by screwing bolts, for example.

The one member 101 and the other member 102 are fastened, and the upper surface 15a of the upper outer periphery side annular portion 15 of the upper gasket member 10 and the upper surface 17a of the upper inner periphery side annular portion 17 contact (surface contact) the plane 101a of the one member 101 and is pressed to the lower side (the arrow b direction). Further, the lower surface 25b of the lower outer periphery side annular portion 25 of the lower gasket member 20 and the lower surface 27b of the lower inner periphery side annular portion 27 contact the plane 102a of the other member 102 and are pressed to the upper side (the arrow a direction).

Thereby, the metal plate 11 of the upper gasket member 10 elastically deforms, the upper outer periphery portion 14 and the upper inner periphery portion 16 are curved to the lower side (the arrow b direction) to the upper base portion 13, the angels θ2 and θ1 decrease, and the height h2 of the upper outer periphery side annular portion 15 and the height h1 of the upper inner periphery side annular portion 17 decrease. Further, the metal plate 21 of the lower gasket member 20 elastically deforms, the lower outer periphery portion 24 and the lower inner periphery portion 26 are curved to the upper side (the arrow a direction) to the lower base portion 23, the angels θ4 and θ3 decrease, and the height h4 of the lower outer periphery side annular portion 25 and the height h3 of the lower inner periphery side annular portion 27 decrease.

When the one member 101 and the other member 102 are further fastened firmly, a space between the plane 101a and the plane 102a is further narrowed, and when the space between the plane 101a and the plane 102a reaches a certain space, a reaction force to the upper base portion 13 that is generated by bending deformation of the upper outer periphery portion 14 and the upper inner periphery portion 16 of the upper gasket member 10 exceeds a predetermined value, and the upper base portion 13 warps and bends so as to project to the upper side (the arrow a direction) as illustrated in FIG. 3. Thereby, surface contact of the upper base portion 13 of the upper gasket member 10 and the lower base portion 23 of the lower gasket member 20 is eliminated.

The upper gasket member 10 contacts a lower outer periphery contact portion 20a and a lower inner periphery contact portion 20b that will be described later of the lower gasket member 20, in a portion (Hereinafter, referred to as an upper outer periphery contact portion 10a.) in a vicinity of a connection portion (outer periphery edge portion 13d) of the upper base portion 13 and the upper outer periphery portion 14, and a portion (Hereinafter, referred to as an upper inner periphery contact portion 10b.) in a vicinity of a connection portion (inner periphery edge portion 13c) of the upper base portion 13 and the upper inner periphery portion 16. Further, the upper gasket member 10 contacts the plane 101a of the one member 101 in a center portion of the upper surface 13a of the upper base portion 13 and a vicinity of the center portion (Hereinafter, referred to as an upper surface center contact portion 10c.).

Further, at this time, the upper outer periphery side annular portion 15 continues to contact the plane 101a of the one member 101 in the upper surface 15a, and the upper inner periphery side annular portion 17 also continues to contact the plane 101a of the one member 101 in the upper surface 17a. In this way, between the one member 101 and the lower gasket member 20, five seal lines are formed by the upper gasket member 10.

When a space between the plane 101a and the plane 102a reaches a certain space, a reaction force to the lower base portion 23 that is generated by bending deformation of the lower outer periphery portion 24 and the lower inner periphery portion 26 of the lower gasket member 20 exceeds a predetermined value, and the lower base portion 23 warps and bends so as to project toward the lower side (the arrow b direction) as illustrated in FIG. 3. Thereby, surface contact of the lower base portion 23 of the lower gasket member 20 and the upper base portion 13 of the upper gasket member 10 is eliminated.

The lower gasket member 20 contacts the upper outer periphery contact portion 10a and the upper inner periphery contact portion 10b of the upper gasket member 10 in a portion (Hereinafter, referred to as the lower outer periphery contact portion 20a.) in a vicinity of the connection portion (outer periphery edge portion 23d) of the lower base portion 23 and the lower outer periphery portion 24, and a portion (Hereinafter, referred to as the lower inner periphery contact portion 20b.) in a vicinity of the connection portion (inner periphery edge portion 23c) of the lower base portion 23 and the lower inner periphery portion 26. Further, the lower gasket member 20 contacts the plane 102a of the other member 102 in a center portion of the lower surface 23b of the lower base portion 23 and a vicinity (Hereinafter, referred to as the lower surface center contact portion 20c.) of the center portion.

Further, at this time, the lower outer periphery side annular portion 25 continues to contact the plane 102a of the other member 102 in the lower surface 25b, and the lower inner periphery side annular portion 27 also continues to contact the plane 102a of the other member 102 in the lower surface 27b. In this way, five seal lines are formed by the lower gasket member 20, between the other member 102 and the upper gasket member 10.

When a fastening force of the one member 101 and the other member 102, that is, an axial force of the bolts reach a predetermined set value, fastening of the one member 101 and the other member 102 is completed, and the gasket 1 is in a mounted state. In this way, the gasket 1 is in a state of being arranged and pressed to seal the space between the plane 101a and the plane 102a with desired airtightness.

In the gasket 1 that is arranged and pressed in the mounted state, in the upper outer periphery side annular portion 15, the upper rubber layer 12a is pressed with a pressure of a desired magnitude to the plane 101a of the one member 101 and is in close contact with the plane 101a, and contact pressure of a desired magnitude occurs to a seal line s2 formed in the contact portion. Further, in the upper inner periphery side annular portion 17, the upper rubber layer 12a is pressed with a pressure of a desired magnitude to the plane 101a of the one member 101 and is in close contact with the plane 101a, and contact pressure of a desired magnitude occurs to a seal line s1 formed in the contact portion.

Further, the upper outer periphery contact portion 10a is in close contact with the lower outer periphery contact portion 20a by the lower rubber layer 12b being pressed with a pressure of a desired magnitude to the lower gasket member 20, and contact pressure of a desired magnitude occurs to a seal line s4 formed in the contact portion. Further, the upper inner periphery contact portion 10b is in close contact with the lower inner periphery contact portion 20b by the lower rubber layer 12b being pressured with a pressure of a desired magnitude to the lower gasket member 20, and a contact pressure of a desired magnitude occurs to a seal line s3 formed in the contact portion.

Further, in an upper surface center contact portion 10c, the upper rubber layer 12a is pressed with a pressure of a desired magnitude to the plane 101a of the one member 101 and is in close contact with the plane 101a, and contact pressure of a desired magnitude occurs to a seal line s5 formed in the contact portion.

In the lower outer periphery side annular portion 25, the lower rubber layer 22b is pressed with a pressure of a desired magnitude to the plane 102a of the other member 102 and is in close contact with the plane 102a, and contact pressure of a desired magnitude occurs to a seal line s7 formed in the contact portion. Further, in the lower inner periphery side annular portion 27, the lower rubber layer 22b is pressed with a pressure of a desired magnitude to the plane 102a of the other member 102 to be in close contact with the plane 102a, and contact pressure of a desired magnitude occurs to a seal line s6 formed in the contact portion.

Further, in the lower outer periphery contact portion 20a, the upper rubber layer 22a is pressed with a pressure of a desired magnitude to the upper gasket member 10 to be in close contact with the upper outer periphery contact portion 10a, and contact pressure of a desired magnitude occurs to a seal line s9 formed in the contact portion. Further, in the lower inner periphery contact portion 20b, the upper rubber layer 22a is pressed with a pressure of a desired magnitude to the upper gasket member 10 to be in close contact with the upper inner periphery contact portion 10b, and contact pressure of a desired magnitude occurs to a seal line s8 formed in the contact portion.

Further, in the lower surface center contact portion 20c, the lower rubber layer 22b is pressed with a pressure of a desired magnitude to the plane 102a of the other member 102 to be in close contact with the plane 102a, and a contact pressure of a desired magnitude occurs to a seal line s10 formed in the contact portion.

Accordingly, the gasket 1 seals the space between the plane 101a and the plane 102a in the mounted state, and restrains a matter inside the one member 101 and the other member 102, for example, lubricating oil or the like from leaking out through a gap between the planes 101a and 102a from the inner periphery side (the arrow c direction). Further, the gasket 1 prevents external salt water, a snow melting agent, dust and the like from entering through the gap between the planes 101a and 102a from the outer periphery side (the arrow d direction).

Further, in the gasket 1 arranged and pressed in the mounted state, the outer periphery edge portion 15d that is the edge portion on the outer periphery side of the upper outer periphery side annular portion 15 of the upper gasket member 10 is located in a same position as a corner portion on the lower side (the arrow b direction) in the diameter increasing surface 103 of the plane 101a of the one member 101 in the radial direction (the arrows cd directions). Further, the outer periphery edge portion 25d that is the edge portion on the outer periphery side of the lower outer periphery side annular portion 25 of the lower gasket member 20 is located at a same position as a corner portion on the upper side (the arrow a direction) in the diameter increasing surface 104 of the plane 102a of the other member 102 in the radial direction (the arrows cd directions).

In this way, in the gasket 1 according to the embodiment of the present disclosure, the upper gasket member 10 and the lower gasket member 20 are disposed to oppose each other. The upper gasket member 10 includes the upper base portion 13 of the annular flat plate, the upper outer periphery portion 14 extending diagonally to the upper side (the arrow a direction) from the outer periphery edge portion 13d of the upper base portion 13, and the upper outer periphery side annular portion 15 of the annular flat plate extending in the extension direction (the radial direction (the arrows cd directions) of the upper base portion 13 from the outer periphery edge portion 14d of the upper outer periphery portion 14. Further, the lower gasket member 20 includes the lower base portion 23 of the annular flat plate, the lower outer periphery portion 24 that extends diagonally to the lower side (the arrow b direction) from the outer periphery edge portion 23d of the lower base portion 23, and the lower outer periphery side annular portion 25 of the annular flat plate extending in the extension direction (radial direction (the arrows cd directions)) of the lower base portion 23 from the outer periphery edge portion 24d of the lower outer periphery portion 24.

Consequently, in the gasket 1 arranged and pressed in the mounted state, the contact pressure of a desired magnitude occurs to the seal line s2 formed in the contact portion of the upper surface 15a of the upper outer periphery side annular portion 15 and the plane 101a of the one member 101. Further, the contact pressure of a desired magnitude occurs to the seal line s7 that is formed in the contact portion of the lower surface 25b of the lower outer periphery side annular portion 25 and the plane 102a of the other member 102.

Accordingly, there is no gap between the plane 101a of the one member 101 of the object to be sealed and the upper surface 15a of the upper outer periphery side annular portion 15 of the upper gasket member 10, salt water can be prevented from staying between the plane 101a of the one member 101 and the upper surface 15a of the upper outer periphery side annular portion 15, and a speed at which the one member 101 is corroded can be further reduced. Further, since there is no gap between the plane 102a of the other member 102 of the object to be sealed and the lower surface 25b of the lower outer periphery side annular portion 25 of the lower gasket member 20, salt water can be prevented from staying between the plane 102a of the other member 102 and the lower surface 25b of the lower outer periphery side annular portion 25, and a speed at which the other member 102 is corroded can be further reduced.

Further, since the upper rubber layer 12a of the upper outer periphery side annular portion 15 of the upper gasket member 10 is pressed to the plane 101a of the one member 101 and is in close contact with the plane 101a, the metal plate 11 of the upper gasket member 10 can be prevented from breaking the one member 101 by contacting the one member 101. Further, since the lower rubber layer 22b of the lower outer periphery side annular portion 25 of the lower gasket member 20 is pressed to the plane 102a of the other member 102 to be in close contact with the plane 102a, the metal plate 21 of the lower gasket member 20 can be prevented from breaking the other member 102 by contacting the other member 102.

Further, since the upper surface 15a of the upper outer periphery side annular portion 15 of the upper gasket member 10 is pressed to the plane 101a of the one member 101 and is in close contact with the plane 101a, the space between the one member 101 and the other member 102 can be closed in a wide range by the upper outer periphery side annular portion 15. Further, since the lower surface 25b of the lower outer periphery side annular portion 25 of the lower gasket member 20 is pressed to the plane 102a of the other member 102 and is in close contact with the plane 102a, the space between the one member 101 and the other member 102 can be closed in a wide range by the lower outer periphery side annular portion 25. Consequently, in the gasket 1, external salt water, a snow melting agent, dust and the like can be further prevented from entering via the gap between the planes 101a and 102a from the outer periphery side (the arrow d direction).

Further, the upper gasket member 10 includes the upper inner periphery portion 16 that extends diagonally to the upper side (the arrow a direction) from the outer periphery edge portion 13d of the upper base portion 13, and the upper inner periphery side annular portion 17 of the annular flat plate extending in the extension direction (the radial direction (the arrows cd directions)) of the upper base portion 13 from the inner periphery edge portion 16c of the upper inner periphery portion 16. The lower gasket member 20 includes the lower inner periphery portion 26 diagonally extending to the lower side (the arrow b direction) from the inner periphery edge portion 23c of the lower base portion 23, and the lower inner periphery side annular portion 27 of the annular flat plate extending in the extension direction (the radial direction (the arrows cd directions)) of the lower base portion 23 from the inner periphery edge portion 26c of the lower inner periphery portion 26.

Consequently, since the upper surface 17a of the upper inner periphery side annular portion 17 of the upper gasket member 10 is pressed to the plane 101a of the one member 101 and is in close contact with the plane 101a, the space between the one member 101 and the other member 102 can be closed in the wide range by the upper inner periphery side annular portion 17. Further, since the lower surface 27b of the lower inner periphery side annular portion 27 of the lower gasket member 20 is pressed to the plane 102a of the other member 102 and is in close contact with the plane 102a, the space between the one member 101 and the other member 102 can be closed in the wide range by the lower inner periphery side annular portion 27. Thereby, lubricating oil or the like inside of the one member 101 and the other member 102 can be further restrained from leaking out via the gap between the planes 101a and 102a from the inner periphery side (the arrow c direction).

Further, in the sealing structure 100 according to the embodiment of the present disclosure, the one member 101 and the other member 102 respectively include the diameter increasing surfaces 103 and 104 that increases in diameter toward the directions (the arrows ab directions) away from each other, in the end portions of the outer periphery side (the arrow d direction). Further, in the sealing structure 100 according to the embodiment of the present disclosure, the outer periphery edge portion 15d of the upper outer periphery side annular portion 15 is located in a same position as a corner portion on the lower side (the arrow b direction) in the diameter increasing surface 103 of the plane 101a of the one member 101, and the outer periphery edge portion 25d of the lower outer periphery side annular portion 25 is located in a same position as a corner portion on the upper side (the arrow a direction) in the diameter increasing surface 104 of the plane 102a of the other member 102. Consequently, salt water can be prevented from staying in the plane 101a of the one member 101 and the plane 102a of the other member 102, and a speed at which the one member 101 and the other member 102 are corroded can be further reduced.

The preferred embodiment of the present disclosure is described thus far, but the present disclosure includes all modes included in the concept and the claims of the present disclosure without being limited to the above described embodiment. Further, the respective components may be properly combined selectively to exhibit at least part of the aforementioned problem and effect. Further, for example, shapes, materials, dispositions, sizes and the like of the respective components in the above described embodiment can be properly changed according to specific usage modes of the present disclosure.

For example, in the gasket 1 according to the embodiment of the present disclosure, the embodiment of the present disclosure is described by taking the case where the upper outer periphery side annular portion 15 and the lower outer periphery side annular portion 25 are formed in the free state as an example. However, the present disclosure is not limited to this, and the upper outer periphery side annular portion 15 and the lower outer periphery side annular portion 25 may be curved and formed in the gasket 1 that is arranged and pressed in the mounted state.

Further, in the gasket 1 according to the embodiment of the present disclosure, the embodiment of the present disclosure is explained by taking the case where the upper inner periphery portion 16, the upper inner periphery side annular portion 17, the lower inner periphery portion 26 and the lower inner periphery side annular portion 27 are included as an example. However, the present disclosure is not limited to this, and does not have to have the upper inner periphery portion 16, the upper inner periphery side annular portion 17, the lower inner periphery portion 26 and the lower inner periphery side annular portion 27, and shapes of the inner periphery sides (the arrow c direction) of the upper gasket member 10 and the lower gasket member 20 can be arbitrary shapes that can restrain the lubricating oil or the like in the one member 101 and the other member 102 from leaking out.

What is claimed is:

1. A gasket comprising a pair of gasket members each including a metal plate, and rubber layers coated on both surfaces of the metal plate, wherein
the pair of gasket members oppose each other, and respectively comprise base portions of annular flat plates,
outer periphery portions diagonally extending in directions away from each other from edge portions on an outer periphery side of the base portions,
outer periphery side annular portions of annular flat plates extending in an extension direction of the base portions from the edge portions on the outer periphery side of the outer periphery portions,
inner periphery portions diagonally extending in directions away from each other from edge portions on an inner periphery side of the base portions,
inner periphery side annular portions of the annular flat plate extending in the extension direction of the base portions from edge portions on the inner periphery side of the pair of inner periphery portions, and
outer surfaces of the base portions of the pair of gasket members are permitted to warp outwardly in a sealing state such that when the pair of the gasket members are provided between a pair of members, the pair of gasket members at least contact the pair of members at three separate points, the three separate points including the outer periphery side annular portions, the inner periphery side annular portions, and the warped base portions between the outer periphery portions and the inner periphery portions.

2. The gasket according to claim 1, wherein
the outer periphery portions respectively increase in diameter toward the directions away from each other, and
the inner periphery portions respectively decrease in diameter toward the directions away from each other.

3. A sealing structure comprising a pair of members that form a housing by being combined with each other, and a gasket that is arranged and held in a space between the pair of members, is elastically deformed by being arranged and pressed in the space between the pair of members, and seals the space between the pair of members, the sealing structure wherein
the gasket includes a pair of gasket members each including a metal plate and rubber layers coated on both surfaces of the metal plate, and
a connection member connecting the pair of gasket members,
the pair of gasket members oppose each other, and respectively include base portions of annular flat plates, outer periphery portions diagonally extending in directions away from each other from edge portions on an outer periphery side of the base portions, outer periphery side annular portions of annular flat plates extending in extension directions of the base portions from edge portions on the outer periphery side of the outer periphery portions, inner periphery portions diagonally extending in directions away from each other from edge portions on an inner periphery side of the base portions, and inner periphery side annular portions of the annular flat plate extending in the extension direction of the base portions from edge portions on the inner periphery side of the pair of inner periphery portions,
the base portions of the pair of gasket members are configured to warp toward and contact the pair of members, respectively, such that the pair of gasket members at least contact the pair of members at three separate points, the three separate points including the outer periphery side annular portions, the inner periphery side annular portions, and the warped base portions between the outer periphery portions and the inner periphery portions, and
the pair of members that form the housing respectively include diameter increasing surfaces increasing in diameter toward the directions away from each other, in end portions on the outer periphery side, and diameter decreasing surfaces decreasing in diameter toward the directions away from each other, in end portions on the inner periphery side.

4. The sealing structure according to claim 3, wherein
the outer periphery portions of the pair of gasket members respectively increase in diameter toward the directions away from each other, and
the inner periphery portions of the pair of gasket members respectively decrease in diameter toward the directions away from each other.

5. The sealing structure according to claim 3, wherein
the pair of gasket members are elastically deformed to form five seal lines together with the pair of members that form the housing,
the inner periphery side annular portions of annular flat plates of the pair of gasket members respectively contact the pair of members to provide a first seal line,
the outer periphery side annular portions of annular flat plates of the pair of gasket members respectively contact the pair of members to provide a second seal line,
the pair of gasket members contact each other at inner periphery contact portions to provide a third seal line, the inner periphery contact portions being positioned on the outer periphery side of the inner periphery side annular portions,
the pair of gasket members contact each other at outer periphery contact portions to provide a fourth seal line, the outer periphery contact portions being positioned on the inner periphery side of the outer periphery side annular portions and on the outer periphery side of the inner periphery contact portions, and
the pair of gasket members are warped toward and contact the pair of members, respectively, between the inner periphery contact portions and the outer periphery contact portions, to provide a fifth seal line,
wherein the first seal line, the second seal line and the fifth seal line correspond to the three separate points.

6. The gasket according to claim 1, wherein
the pair of gasket members are configured to be elastically deformed to form five seal lines together with the pair of members when the pair of the gasket members are provided between the pair of members,
the inner periphery side annular portions of annular flat plates of the pair of gasket members respectively contact the pair of members to provide a first seal line,
the outer periphery side annular portions of annular flat plates of the pair of gasket members respectively contact the pair of members to provide a second seal line,
the pair of gasket members contact each other at inner periphery contact portions to provide a third seal line, the inner periphery contact portions being positioned on the outer periphery side of the inner periphery side annular portions,
the pair of gasket members contact each other at outer periphery contact portions to provide a fourth seal line, the outer periphery contact portions being positioned on the inner periphery side of the outer periphery side annular portions and on the outer periphery side of the inner periphery contact portions, and
the warped base portions of the pair of gasket members contact the pair of members, respectively, between the inner periphery contact portions and the outer periphery contact portions, to provide a fifth seal line,
wherein the first seal line, the second seal line and the fifth seal line correspond to the three separate points.

7. The gasket according to claim 1, wherein the outer periphery side annular portions have an annular shape that enclose the outer periphery portions, the annular base portions, the inner periphery portions and the inner periphery side annular portions.

8. The sealing structure according to claim 3, wherein the outer periphery side annular portions have an annular shape that enclose the outer periphery portions, the annular base portions, the inner periphery portions and the inner periphery side annular portions.

* * * * *